(12) United States Patent
Wurmfeld et al.

(10) Patent No.: US 10,704,121 B1
(45) Date of Patent: Jul. 7, 2020

(54) SYSTEMS AND METHODS FOR LOWERING THE REDUCTION OF IRON ORE ENERGY

(71) Applicant: Capital One Services, LLC, McLean, VA (US)

(72) Inventors: David Wurmfeld, Falls Church, VA (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/548,486

(22) Filed: Aug. 22, 2019

(51) Int. Cl.
| | |
|---|---|
| *C22B 9/05* | (2006.01) |
| *H05H 1/00* | (2006.01) |
| *C22B 4/00* | (2006.01) |
| *C22B 1/16* | (2006.01) |

(52) U.S. Cl.
CPC ............. *C22B 9/05* (2013.01); *C22B 1/16* (2013.01); *C22B 4/005* (2013.01); *H05H 1/0037* (2013.01)

(58) Field of Classification Search
CPC ................ C22B 9/05; C22B 4/005
See application file for complete search history.

(56) References Cited

U.S. PATENT DOCUMENTS

| 3,236,607 A | | 6/1963 | Porter et al. |
| 3,140,168 A | | 7/1964 | Halley et al. |
| 3,993,473 A | * | 11/1976 | MacRae .............. C21B 13/0046 75/10.22 |
| 4,002,466 A | * | 1/1977 | MacRae .................. C21B 5/002 75/10.22 |

FOREIGN PATENT DOCUMENTS

EP          0019362 B1     4/1980

* cited by examiner

*Primary Examiner* — Scott R Kastler
(74) *Attorney, Agent, or Firm* — Pillsbury Winthrop Shaw Pittman LLP

(57) ABSTRACT

A method of reducing metal oxides in a plasma arc torch comprising a cathode and an anode. The method comprises collecting a set of metallic oxide ore and filtering the set of ore based on a particle size. The method further comprises preprocessing the filtered ore with the application of a heat gradient or an electric current. The preprocessed ore is mixed with a composition of reduction gases. The mixture is injected into the plasma arc torch to form a post-plasma mixture. The method further comprises collecting the post-plasma mixture and analyzing the post-plasma mixture. The method also comprises separating the post-plasma mixture into a set of slag and a set of liquid.

18 Claims, 6 Drawing Sheets

SYSTEMS AND METHODS FOR LOWERING THE REDUCTION OF IRON ORE ENERGY

TECHNICAL FIELD

The present disclosure generally relates to systems and methods for lowering the activation energy of iron ore reduction.

BACKGROUND

Pure elemental iron, Fe, is generally produced by carbothermic reduction reactions of medium- or high-grade iron ore. The processes involve carbon-based coke (i.e., processed from coal), and generally involve multiple steps such as cokemaking, palletization, and sintering. Additionally, the multi-stepped processes produce carbon-based emissions throughout each step. The carbon acts as a reducing agent and reacts with iron ores to produce elemental iron. By using hydrogen as a reducing agent, however, the process reduces carbon-based emissions and is generally simpler.

As one example, the application of hydrogen in a plasma arc, e.g., a hydrogen plasma smelting reduction, intensifies the reduction processes. Hydrogen-based processes enable production of iron in a one-stage process and avoid introducing carbon into the atmosphere.

One traditional process for reducing iron ore is the production of liquid iron via blasts furnaces and/or basic oxygen furnaces. This is the longest and most time-consuming reduction method. Blast furnace production of liquid iron is a four-step process. This process generally has the highest $CO_2$ emissions, but it is optimized for energy efficiency.

Another reduction process combines direct reduction with electric arc furnaces. This is a three-step process that reduces the use of carbon-based reduction. However, it is not a process optimized for energy efficiency.

A third process, hydrogen plasma smelting reduction, is a one-step process focusing on reducing conditions. Hydrogen plasma smelting reduction applies high plasma temperatures to hydrogen gas mixtures to intensify the reduction processes. Because the enthalpies of molecular hydrogen and liquid iron oxide are approximately equal, a high plasma temperature (15,000-20,000° C.) is generally required to facilitate the reduction process.

Nevertheless, for all the processes described above, there are significant thermodynamic energy trade-offs leading to increased production costs and/or increased carbon-based emissions. Additionally, each process has underutilized resources like heat gradients (i.e., from blast furnaces) and electrical fields (i.e. from electric arc furnaces) which both require separate production of energy to create. Accordingly, aspects consistent with the disclosed embodiments address these concerns by providing methods of reducing metal oxides in a plasma arc torch in a way that optimizes resources.

Moreover, while iron reduction processes solutions exist, none are as efficient as the means described herein. The present disclosure provides systems and methods for using reduction processes to better harness excess heat gradients and electric fields in hydrogen plasma smelting reduction.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of reducing iron oxides, the disclosed embodiments are not limited to any particular metallic reduction reaction.

Disclosed embodiments include a method of reducing metal oxides in a plasma arc torch comprising a cathode and an anode. The method comprises collecting a set of metallic oxide ore and filtering the set of ore based on a particle size. The method further comprises preprocessing the filtered ore with the application of a heat gradient or an electric current. The preprocessed ore is mixed with a composition of reduction gases. The mixture is injected into the plasma arc torch to form a post-plasma mixture. The method further comprises collecting the post-plasma mixture and analyzing the post-plasma mixture. The method also comprises separating the post-plasma mixture into a set of slag and a set of liquid.

It is to be understood that both the foregoing general description and the following detailed description are exemplary and explanatory only, and are not restrictive of the disclosed embodiments, as claimed.

BRIEF DESCRIPTION OF DRAWINGS

The accompanying drawings, which are incorporated in and constitute a part of the specification, illustrate several embodiments and, together with the description, serve to explain the disclosed principles. In the drawings.

DETAILED DESCRIPTION

Figure 1:
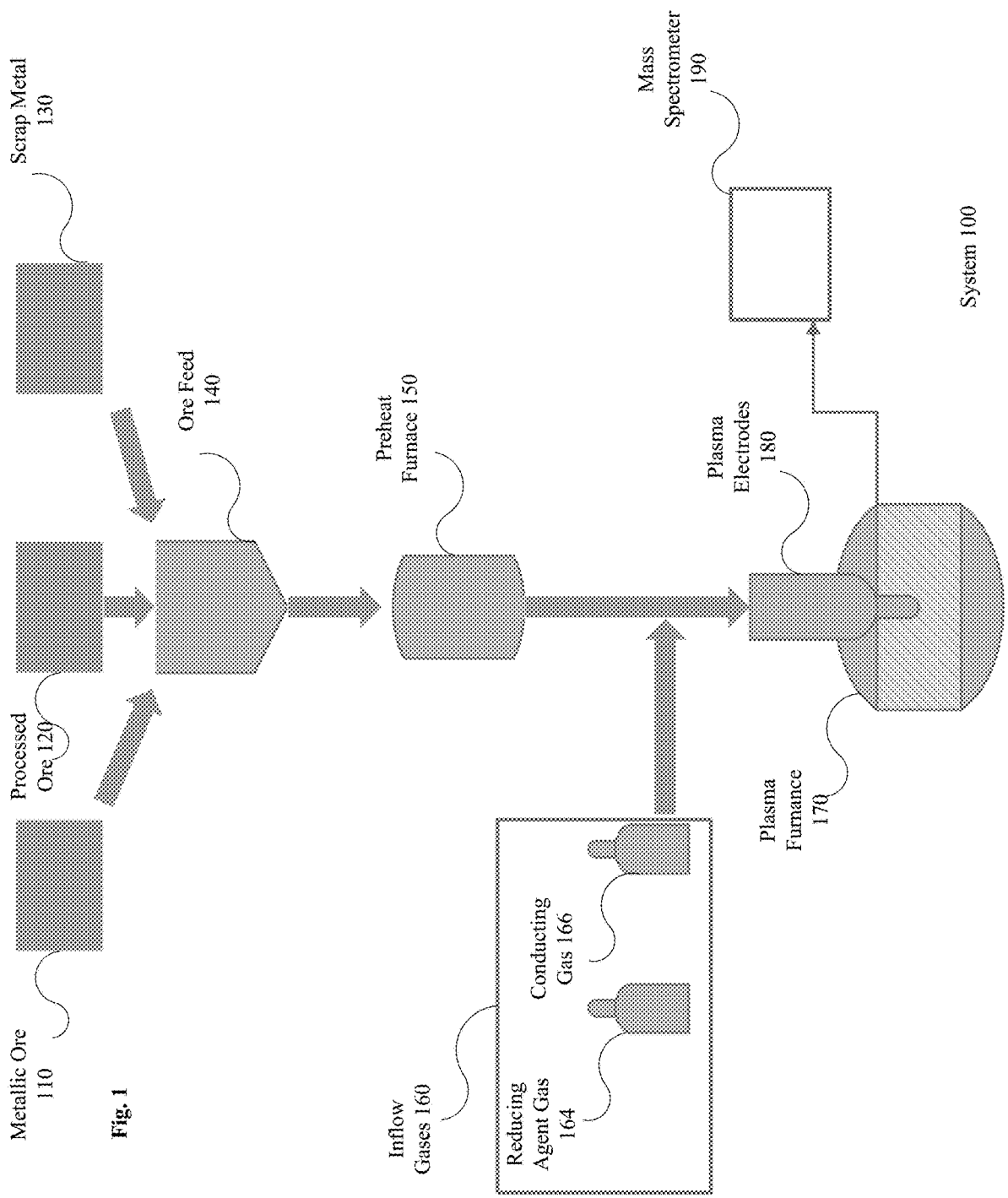
FIG. 1 depicts an exemplary HPSR redox reaction system consistent with disclosed embodiments.

An initial overview of metallic reduction reactions is provided immediately below, followed by specific exemplary embodiments of lowering the activation energy of metallic reduction processes. The initial overview is intended to aid in understanding some of the useful technology and features relevant to the material systems and methods disclosed herein, but it is not intended to limit the scope of the claimed subject matter.

Most metals do not naturally exist in their pure elemental form. Rather, metals are generally mined as ore from the earth in the form of chemical compounds. For instance, due to temperature, atmospheric compositions, and electron energies, pure iron (Fe) is found and mined as iron ore. And based on electron bonding energies, iron generally forms ore compounds with oxygen (O). The three most common iron ore compounds are wüstite (FeO), hematite ($Fe_2O_3$), and magnetite ($Fe_3O_4$).

Pure metals may be extracted from ore compounds through oxidation-reduction (redox) reactions. Redox reactions involve transfers of electrons between two species. The species may be compounds and/or elements. One specie undergoes oxidation by losing electrons while the other specie undergoes reduction by gaining electrons. For most metals, carbon (C) or hydrogen (H) may act as reducing agents (i.e., reducing specie) and react with metallic ores to produce pure metal. For example, the following redox reaction formulas demonstrate the reduction of hematite to pure iron:

$$Fe_2O_3 + 3H_2 \rightarrow 2Fe + 3H_2O \quad (1)$$

$$Fe_2O_3 + 3C \rightarrow 2Fe + 3CO \quad (2)$$

$$2Fe_2O_3 + 3C \rightarrow 4Fe + 3CO_2 \quad (3)$$

In the above reactions (1)-(3), hematite iron ore is reduced by hydrogen or carbon resulting in pure iron and either $H_2O$, CO, or $CO_2$ by-products. Similar redox reactions are possible for wüstite and magnetite, and likewise for additional reducing agents. It is noted that each reaction discussed herein requires breaking chemical bonds. And each reaction, including reactions (1)-(3) above, have their own activation energy—the energy required to break the bonds and initiate the reaction.

There are several metal manufacturing processes for reaching activation energies and reducing metallic ore to pure metal. By applying heat and/or altering the pressure, manufacturing processes reach the respective reaction activation energies and reduce the ore. For iron ore reduction, these manufacturing processes include at least Basic Oxygen Furnaces (BOF), Blast Furnaces (BF), Smelting Reduction (SR), Electric Arc Furnaces (EAF), Direct Reduction (DR), and Hydrogen Plasma Smelting Reduction (HPSR). These processes generally produce liquid elemental iron and various by-product gases. It is further understood that by changing the atmosphere, e.g., including carbon, then liquid steel may be produced (steel generally includes less than 1% carbon).

The HPSR process generates plasma by passing an electric current through a gas. The electric current may be generated by hollow graphite electrodes. Argon (Ar), due to its low ionization energy and high conductivity, is a preferred gas to conduct the current in the plasma arc. But nitrogen (N) may be used as a conducting gas as well. Hydrogen operates as the reducing agent, thus a mixture of hydrogen and argon (or nitrogen) may be injected into the plasma flame wherein electrons and gas molecules collide (the plasma arc zone). The temperatures at the center of the plasma arc zone, at the vicinity of the arc, and at the liquid metal surface mainly depend on the amperage, voltage, arc length, and the gas composition. And, as discussed herein, the by-product off-gases may be further used to preheat the metallic ore and increase the efficiency of the process.

Plasma is the electrically neutral ionization of gas in which the number of negative and positive particles is equal. The gas is ionized by colliding energized electrons with the gas molecules within the plasma arc zone. When particles collide, the particles may change their energy or momentum. Electrons colliding with atoms generally change the electron momentum and ionizes the atom. Collisions between ions and atoms cause the exchange of momentum and energy. The amount of energy transferred for electron-atom collusions is inconsiderable, but the atom-molecule collision generates considerable kinetic energy. All of these collisions occur in the plasma arc zone.

As discussed above, hydrogen under ambient temperature exists only in its molecular form, $H_2$, where the covalent bond between the two atoms is secured by a shared electron pair. In HPSR, the hydrogen and argon gas molecules are ionized in the plasma arc zone. The plasma arc may ionize hydrogen and activate molecular hydrogen and molecular $H_2$, leading to the formation of atomic H; ionic hydrogen H, $H_2$, and $H_3^+$; and excited state H* within the plasma arc zone. Thus, all of these hydrogen-based species may exist around the plasma arc zone. The reduction reaction of hematite is represented by:

$$2Fe_2O_3 + 3\text{Hydrogen plasma}(2H, 2H^+, H_2^+, 2/3H_3^+, \text{ or } H_2^*) \rightarrow Fe + 3H_2O(g) \quad (4)$$

The enthalpies of molecular hydrogen ($H_2$) and liquid iron oxide are approximately equal. However, the activated hydrogen species (atomic H; ionic hydrogen $H^+$, $H_2^+$, and $H_3^+$; and excited state H*) have lower Gibbs standard free energies. With lower Gibbs standard free energies, liquid iron oxide is more likely to be reduced by the activated hydrogen species than molecular hydrogen. Additionally, the activated hydrogen species offer favorable reduction reaction rates at low temperatures (approximately 3,000° C.).

Iron ore is processed into fine chunks and fed into the HPSR reactor. As the iron ore chunks fall through the graphite electrodes, they pass directly through the plasma arc zone and undergo extreme heating and exposure to the hydrogen-argon gas. The iron ore undergoes reduction as well as a solid-to-liquid transformation. Thus, the by-product liquid is collected within the HPSR reactor for cooling.

In HPSR, the redox reactions of iron ore may take place at two different times: (1) inflight passing through the plasma arc zone, and (2) on the surface of the liquid slag. The iron ore is melted in the plasma arc zone and continuously reduced by hydrogen. The remaining nongaseous by-products form a slag. The density of slag is lower than the density of liquid iron. And over time, as gravity collects the liquid iron at the bottom of the plasma reactor, a layer of slag covers the molten elemental metal.

The first set of redox reactions occur inflight as the iron ore chunk passes through the plasma arc zone. The high plasma temperatures both effect the iron chunk and the hydrogen gas mixture. The iron chunk transforms from a solid to a liquid. And the molecular hydrogen gas is ionized and transformed into an activated hydrogen specie (atomic H; ionic hydrogen H, $H_2^+$, and $H_3^+$; and excited state H*). The liquid iron ore further reacts with the molecular hydrogen and/or activated hydrogen species (where redox reactions with activated hydrogen species have lower activation energies). The reduction of the liquid iron ore may occur under the following reactions:

$$Fe_2O_3(L) + H_2(g) \rightarrow 2FeO(L) + H_2O(g) \quad (5)$$

$$FeO(L) + H_2(g) \rightarrow Fe(L) + H_2O(g) \quad (6)$$

The second set of redox reactions occur between the liquid slag and liquid iron. As the molten liquid iron and slag cool away from the plasma arc zone, the molecular hydrogen and ionized hydrogen gas still react. The slag attracts the hydrogen and water vapor and transfers the hydrogen to the liquid iron below. Then again, additional redox reactions occur throughout the liquid slag.

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments are directed to systems and methods for lowering the activation energy of metallic reduction with preprocessing and HPSR processing. While some solutions exist for reducing iron oxides, none provide the elegance and optimization achieved with the embodiments consistent with those discussed here. A process combining reducing processes with HPSR further reduces carbon-based emissions and optimizes excess resources such as heat gradients and electric fields. For instance, collecting BF post-processed and at-temperature slag and subjecting it to a HPSR plasma arc may lower the necessary activation energy and therefore reduce the plasma arc zone parameters (e.g., arc length, amperage, voltage, etc.). As another example, EAF and HPSR furnaces may be combined such that the electric field produced by the EAF is further utilized in the HPSR furnace, thereby lowering the necessary activation energy.

The following description provides examples of systems and methods for lowering the activation energy of iron ore reduction. The arrangement of components shown in the figures is not intended to limit the disclosed embodiments, as the components used in the disclosed methods may vary.

FIG. 1 depicts an illustrative view of a system 100 in accordance with aspects of the disclosed embodiments. At a high level, and without limiting the disclosed embodiments, system 100 includes sources of ore such as Metallic Ore 110, Processed Ore 120, and/or Scrap Metal 130. Feed 140 may collect the sources of ore (e.g., Metallic Ore 110, Processed Ore 120, and/or Scrap Metal 130), and feed them into Preheat Furnace 150 where the ore undergoes preheating. The preheated ore mixes with gaseous mixtures from Inflow Gases 160. The preheated ore-gaseous mixture feeds into Plasma Furnace 170 through Plasma Electrodes 180. Plasma Electrodes 180 process the preheated ore-gaseous mixture with a plasma arc and the process by-products collect within a Plasma Furnace 170 container. Sensors within Plasma Furnace 170 provide data to Mass Spectrometer 190 regarding the composition of the Plasma Furnace 170 contents.

As discussed herein, system 100 may collect metallic chunks. The metallic chunks may comprise any elemental metal in molecular combination with oxygen. For instance, the collected metallic chunks may comprise iron-based oxides such as wüstite (FeO), hematite ($Fe_2O_3$), and magnetite ($Fe_3O_4$); or other metallic-based oxides such as $Cr_2O_3$, $Al_2O_3$, $SiO_2$, $MnO_2$, MgO, and/or CuO. In some embodiments, metallic chunk combinations of iron-based and noniron oxides may be combined. For example, Metallic Ore 110 may comprise chunks of raw mined iron ore of various sizes and containing multiple oxides. In certain aspects, Processed Ore 120 may comprise chunks of processed raw iron ore. In some embodiments, the processed raw iron ore may include preprocessed and size-reduced chunks from pulverizing, crushing, tumbling, sintering, or sieving. In alternative embodiments, the processed iron ore may include chunks processed by BOF, BF, SR, EAF, and/or DR processes. Scrap Metal 130 may comprise recycled metal or metal chunks collected from entities specializing in scrapping. The recycled metal and/or scrap metal chunks may further comprise metals of varying elemental impurities such as rust, oxidation, or other foreign components. The recycled metal and/or scrap metal chunks may further comprise metals of varying alloyed elements. System 100 may collect metallic chunks from sources 110, 120, and 130, but it will be further understood by one skilled in the art that the collection of chunks is not limited to sources 110, 120, and 130 discussed herein.

In some embodiments, Ore Feed 140 may produce a mixture of metallic chunks suitable for preheating in Preheat Furnace 150. In system 100, collected chunks from Metallic Ore 110, Processed Ore 120, and Scrap Metal 130 may be fed into Ore Feed 140. In some embodiments, Ore Feed 140 may reduce the particle size of the metallic chunks through pulverizing, crushing, tumbling, or sieving.

Preheat Furnace 150 may comprise a furnace for increasing the temperature of the metallic chunks. The Preheat Furnace 150 may heat the metallic chunks until low-melting temperature additives are melted away. In some embodiments, the Preheat Furnace 150 may sinter the metallic chunks to facilitate additional particle size modification. Additionally, or alternatively, the Preheat Furnace 150 may heat the metallic chunks to near-melting temperatures. Preheat Furnace 150 may comprise a furnace open to the air or closed to the air. In one embodiment, for example, Preheat Furnace 150 may include an open-air furnace exposed to atmospheric gases. In another embodiment, Preheat Furnace 150 may include a closed-air furnace with controlled gas flows. It will be further understood by one skilled in the art that the metallic chunks, whether flowing from an open-aired or closed air Preheat Furnace 150 may flow through atmospheric controlled gas systems.

Inflow Gases 160 mix the metallic chunks with controlled gases. In some embodiments, the controlled gases may comprise Reducing Agent Gas 164 and a Conducting Gas 166. Reducing Agent Gas 164 may react with the metallic chunks and undergo reduction. Reducing Agent Gas 164 may include, for example, $H_2O$, $H_2$, H, C, CO, and/or $CO_2$ gases or combinations thereof. In contrast, Conducting Gas 166 may comprise gases with high electrical conductivity, such as Ar, or $N_2$, and may be used to create an electric current between two electrodes. Inflow Gases 160 may further comprise pure gas vessels containing the various gas combinations discussed herein. Inflow Gases 160 may comprise sensors such as pressure and/or temperature indicators, or controllers for flow and/or pressure. Inflow Gases 160 may comprise one or more shut-off valves. The metallic chunk and controlled gas mixture may then flow to Plasma Furnace 170 through Plasma Electrodes 180.

Plasma Electrodes 180 may comprise two electrodes for creating an electric current. The electrodes may be parallel to each other and perpendicular to the ground. In some embodiments, Plasma Electrodes 180 may comprise graphite electrodes positioned around a hollow tube such that the electric current is parallel to the ground. In other embodiments, Plasma Electrodes 180 may comprise graphite electrodes parallel to the ground such that the electric current is perpendicular to the ground. In some embodiments, the electrodes may be incorporated into the Plasma Furnace 170 casing. For given amperage and voltage values, the center of the electric current creates the plasma arc zone. Plasma Electrodes 180 may comprise a pipe and the metallic chunk and controlled gas mixture may flow through the hollow graphite electrodes and through the plasma arc zone. Plasma Electrodes 180 may further incorporate sensors to sense and control the amperage, voltage, and arc length.

Plasma Furnace 170 may comprise a pressure sealed chamber for collecting liquid molten iron and slag within the internal casing. As discussed above, Plasma Furnace 170 may contain components of Plasma Electrodes 180 such that one or multiple sets of electrodes are located within the Plasma Furnace 170 casing. For instance, in some embodiments, Plasma Furnace 170 casing may contain an anode electrode at the bottom of the casing and Plasma Electrodes 180 may contain a cathode electrode. It will be further understood by one skilled in the art that Plasma Furnace 170 may incorporate various combinations of anode/cathode electrodes and/or Plasma Electrodes 180 to create the plasma arc current.

Plasma Furnace 170 may further comprise a cooling system for extracting heat from within the casing. Plasma Furnace 170 may incorporate the cooling system within its casing, wherein some embodiments pumps pump water throughout the casing to extract heat. In alternative embodiments, Plasma Furnace 170 may incorporate the cooling system outside its casing. The cooling system may incorporate water, or other cooling liquids, and cooling gases.

Plasma Furnace 170 may comprise sections for collecting and removing by-product off-gases from the reactions or collecting and removing by-product liquid slag and liquid metal. The sections for collecting and removing by-product off-gases may further include pumps to extract the off-gases and remove them from Plasma Furnace 170. In some embodiments, the pumps extracting the off-gases from Plasma Furnace 170 may be attached to Inflow Gases 160 and the extracted off-gases may be reincorporated into the metallic chunk and controlled gas mixture. In alternative embodiments, the pumps extracting the off-gases from Plasma Furnace 170 may be attached to Preheat Furnace 150 to further heat and metallic chunks. The sections for collecting and removing by-product liquid slag may be further connected to Preheat Furnace 150 for additional processing and heating of the metallic chunks. The sections for collecting and removing by-product liquid metal may be connected to another collection system for final cooling and post processing of the elemental iron.

Plasma Furnace 170 may comprise another set of pressure and flow controllers and sensors in addition to components associated with Inflow Gases 160. In some embodiments, Plasma Furnace 170 casing may further incorporate the pressure and flow controllers, and/or the sensors, distributed throughout the casing surface. The pressure and flow controllers, and/or the sensors, may be connected to a computing system with dedicated memory and processors for analyzing the controller data and sensor data. In some embodiments, the controllers, and/or sensors, may be incorporated into the additional sections for collecting the by-product liquid slag/iron and off-gases. In some embodiments, Plasma Furnace 170 may further comprise sensors connected to Mass Spectrometer 190.

Mass Spectrometer 190 may comprise sensors from within Plasma Furnace 170 and/or outside Plasma Furnace 170. Mass Spectrometer 190 may also comprise computing devices such as memory and processors to run software for analyzing mass compositions of gases, liquids, and solids. Mass Spectrometer 190 may determine the elemental, molecular, and energized states of mass compositions within Plasma Furnace 170 based on sensor readings within Plasma Furnace 170. In some embodiments, for example, Mass Spectrometer 190 may determine the elemental, molecular, and energized states of mass compositions for off-gases based on sensors within off-gas sections. Mass Spectrometer 190 may also determine the elemental, molecular, and energized states of mass compositions of by-product liquid slag and liquid metal. In some embodiments, Mass Spectrometer 190 may be further connected to Inflow Gases 160 and/or Plasma Electrodes 180 to further control the amperage, voltage, arc length, and the gas composition within the plasma arc zone.

Figure 2:
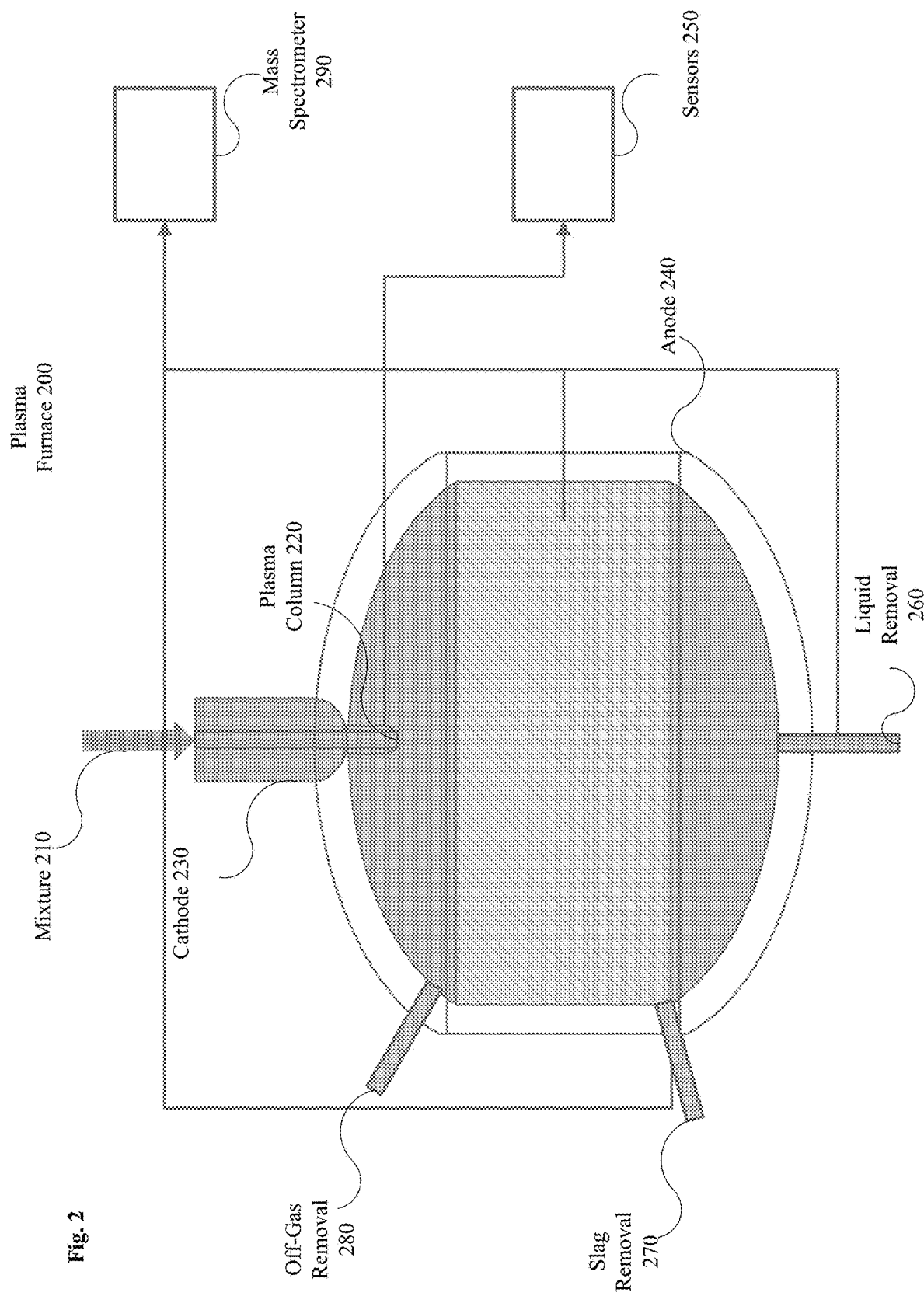
FIG. 2 depicts an exemplary HPSR plasma furnace for the redox reaction system consistent with disclosed embodiments.

FIG. 2 depicts Plasma Furnace 200 as an illustrative embodiment of the pressured sealed plasma furnace chamber casing. In some embodiments, Plasma Furnace 200 may correspond to Plasma Furnace 170 and vice versa. Plasma Furnace 200 may receive feed Mixture 210 into the chamber through Plasma Column 220. While flowing into the chamber through Plasma Column 220, Mixture 210 may encounter an electric current created by Cathode 230 and Anode 240. In some aspects, Cathode 230 and Anode 240 may create a plasma arc zone that causes Mixture 210 to undergo a redox reaction. Sensors 250 near Cathode 230 and/or Anode 240 may detect pressure, electric current, electric voltage, gases, and/or temperature of the plasma arc zone. The redox reaction by-products may include liquid elemental metal, liquid slag, and/or off-gases. Liquid Removal 260 may remove the liquid elemental metal from the chamber. Slag Removal 270 may remove the liquid slag from the chamber. Off-Gas Removal 280 may remove the off-gases from the chamber. The chamber casing may encase additional sensors, or the sensors may be attached to the internal chamber surfacing and further connected to Mass Spectrometer 290.

It will be further understood by one skilled in the art that while the Plasma Furnace 200 chamber is depicted in FIG. 2 as a spherical shape, the chamber may also be angular, cylindrical, rectangular, or any other shape consistent with the disclosed embodiments. It will be further understood that the Plasma Furnace 200 chamber may comprise a cooling system for extracting heat from within the casing. Plasma Furnace 200 may incorporate the cooling system within the furnace casing where, in some embodiments, water is pumped throughout the casing to extract heat. In alternative embodiments, Plasma Furnace 200 may incorporate the cooling system outside the casing. It will be further understood the cooling system may incorporate water, or other cooling liquids, and cooling gases.

As discussed herein, Mixture 210 may comprise a metallic chunk and controlled gas mixture (e.g., consistent with the metallic chuck and controlled gases disclosed in connection with Inflow Gases 160). For example, the controlled gases may comprise Reducing Agent Gas 164 and Conducting Gas 164 as discussed above. In some embodiments, Mixture 210 may further include by-product off-gases of pre-processing heat treatments, such as discussed for Processed Ore 120 or Preheat Furnace 150. Mixture 210 may further include by-product off-gases of post-processing heat treatments as discussed throughout herein for HPSR. In some embodiments, Mixture 210 may contain chunks of the targeted metal. For instance, in some embodiments, pure elemental iron metal may be targeted, thus the metallic chunks may contain various sized pieces of iron ore and iron scrap metal discussed for Metallic Ore 110, Processed Ore 120, and/or Scrap Metal 130. In alternative embodiments, Mixture 210 may comprise HPSR by-product liquid slag. The solid-liquid-gas Mixture 210 flows into Plasma Furnace 200 through Plasma Column 220. It will be further understood that Mixture 210 may contain by-product solids, liquids, and gases at high temperatures (e.g., temperatures exceeding 3,000° C.), and thus Mixture 210 may be contained in systems designed to withstand the temperatures.

Plasma Column 220 feeds Mixture 210 through Cathode 230 and into the Plasma Furnace 200 chamber. In some embodiments, Plasma Column 220 may be a hollow tube. Plasma Column 220 may comprise a feeding material system designed to withstand high temperatures (e.g., temperatures exceeding 3,000° C.). In some embodiments, Plasma Column 220 may comprise a conductive feeding material system designed to conduct the electric current produced for the plasma arc. In some embodiments, Plasma Column 220 may comprise a feeding material system of graphite or non-erosive metallic alloys.

Cathode 230 may be an electrical conductor used with Anode 240 to form an electric circuit. Cathode 230 and/or Anode 240 may be traditional electrochemical cells in which, by a chemical reaction, the cathode receives electrons and the anode provides electrons. Cathode 230 and/or Anode 240 may be a bipolar electrode capable of functioning as an anode or cathode of the respective other cell. Cathode 230 and/or Anode 240 may be primary cells in which the reaction is fixed (i.e., the polar identifies of the cathode and anode are fixed), and the cells may not be recharged. Cathode 230 and/or Anode 240 may be secondary cells in which the chemical reactions are reversible and the cells may be recharged. Cathode 230 and Anode 240 may be further connected with a computing devices such as memory and processors to run software for controlling the electric current. The computing devices may control the Cathode 230 and/or Anode 240 amperage, voltage, and/or arc length.

Cathode 230 and/or Anode 240 may comprise several respective electrodes. Cathode 230 and Anode 240 may be arranged throughout the Plasma Furnace 200 internal casing to move the plasma arc zone to specific regions of Plasma Furnace 200. In some embodiments, Cathode 230 may be incorporated into Plasma Column 220, and/or Cathode 230 and Plasma Column 220 may be incorporated into the Plasma Furnace 200 chamber casing. In alternative embodiments, Cathode 230 may be arranged around Plasma Column 220 such that multiple respective cathode electrodes encase Plasma Column 220. In some embodiments, Plasma Column 220 may incorporate Cathode 230 and Anode 240 together such that several respective cathodes and anodes alternate and encase Plasma Column 220. In some embodiments, Plasma Furnace 200 may incorporate Anode 240 into the chamber casing. In alternative embodiments, Plasma Furnace 200 may incorporate Anode 240 on the internal surface of the chamber casing. In some embodiments, Cathode 230 may be near the top portion of the Plasma Furnace 200 chamber casing with Anode 240 near the bottom portion of the Plasma Furnace 200.

In some embodiments, Plasma Furnace 200 may incorporate Sensors 250. Sensors 250 may include suitable sensors such as pressure or temperature indicators and/or controllers for measuring Mixture 210 flow and pressure; sensors for measuring amperage, voltage, and arc length of the plasma arc; and/or sensors for measuring the composition of pre- and post-plasma arc processed Mixture 210. Although FIG. 2 depicts Sensors 250 located near Plasma Column 220, it will be understood by one skilled in the art that multiple sensors, for measuring multiple parameters discussed herein, Sensors 250 may be placed at multiple locations throughout Plasma Furnace 200. For instance, in some embodiments, Sensors 250 may be located at the end of Plasma Column 220 within Plasma Furnace 200. In alternate embodiments, Sensors 250 may be located at the end of Plasma Column 220 outside Plasma Furnace 200. In some embodiments, Sensors 250 may be located on the Plasma Furnace 200 internal chamber casing surface by sections 260, 270, and/or 280. In some embodiments, Sensors 250 may be attached within the Plasma Furnace 200 internal chamber casing away from the internal casing surface. In certain embodiments, Sensors 250 may be attached such that they are within the Plasma Furnace 200 chamber casing. Additionally, or alternatively, Sensors 250 may be attached outside Plasma Furnace 200 and near the removal sections 260, 270, and 280. And in some embodiments, Sensors 250 may be further connected with Mass Spectrometer 290.

Plasma Furnace 200 may comprise additional sections for collecting and removing redox reaction by-products from the pressure chamber. Liquid Removal 260 section may collect and remove redox reaction by-product liquid elemental metal from the Plasma Furnace 200 chamber. The liquid elemental metal may comprise the targeted metal, for instance elemental liquid Fe. In some embodiments, the liquid elemental metal may still be cooling from the HPSR plasma arc, thus will may be warm. Liquid Removal 260 may thus comprise a material system designed to withstand high temperatures. Plasma Furnace 200 may incorporate Liquid Removal 260 near the bottom of the chamber as a drainage. Plasma Furnace 200 may incorporate Liquid Removal 260 connected with Sensors 250 to determine the properties of the liquid elemental metal and further determine its composition, temperature, and flow rate. Liquid Removal 260 may be further connected with control valves to control the rate of liquid elemental metal removal, or in some embodiments, stop the removal entirely. In some embodiments, Liquid Removal 260 may further comprise a cooling system consistent with the cooling systems discussed herein. In some embodiments, Liquid Removal 260 may be connected with additional post-processing systems for cooling and/or post processing of the elemental metal.

Slag Removal 270 section may collect and remove the redox reaction by-product liquid slag from the Plasma Furnace 200 chamber. The liquid slag may comprise the targeted metal-based alloys and the remaining nongaseous by-products. The liquid slag may still be cooling from the HPSR plasma arc, thus will may be warm. Slag Removal 270 may thus comprise a material system designed to withstand high temperatures. Plasma Furnace 200 may incorporate Slag Removal 270 near the bottom of the chamber, or near the center of the chamber where slag may float on top of the liquid metal. Slag Removal 270 may be further connected with Sensors 250 to determine the properties of the liquid slag and further determine its composition, temperature, and flow rate. Slag Removal 270 may be further connected with control valves to control the rate of liquid slag removal, or in some embodiments, stop the removal entirely. In some embodiments, Slag Removal 270 may further comprise a cooling system consistent with the cooling systems discussed herein. In some embodiments, Slag Removal 270 may be further connected to preheating processes for additional processing and heating of Mixture 210.

Off-Gas Removal 280 section may collect and remove the redox reaction by-product off-gases from the Plasma Furnace 200 chamber. The off-gases may comprise the reduction agent gases from Mixture 210, conductive gases from Mixture 210, and/or the by-product redox reaction gases. The off-gases may still be cooling from the HPSR plasma arc, and thus may be warm. Off-Gas Removal 280 may thus comprise a material system designed to withstand high temperatures. Plasma Furnace 200 may incorporate Off-Gas Removal 280 near the top of the chamber, or near the center of the chamber where the off-gases may be located. Off-Gas Removal 280 may further include pumps for extracting the off-gases from Plasma Furnace 200. Off-Gas Removal 280 may be further connected with Sensors 250 to determine the properties of the gases to determine its composition, temperature, and flow rate. Off-Gas Removal 280 may be further connected with control valves to control the rate of extraction, or in some embodiments, stop the removal entirely. In some embodiments, Off-Gas Removal 280 may further comprise a cooling system consistent with the cooling systems discussed herein. In some embodiments, Off-Gas Removal 280 may be further connected to preheating processes for additional processing and heating of Mixture 210.

Mass Spectrometer 290 may comprise sensors from within Plasma Furnace 200 and/or outside Plasma Furnace 200. In some embodiments, Mass Spectrometer 290 may correspond to Mass Spectrometer 190 and vice versa. Mass Spectrometer 290 may be further incorporated with Sensors 250. Mass Spectrometer 290 may comprise computing devices such as memory and processors to run software for analyzing mass compositions of gases, liquids, and solids. Mass Spectrometer 290 may determine the elemental, molecular, and energized states of mass compositions within Plasma Furnace 200 based on sensor readings within Plasma Furnace 200. In some embodiments, Mass Spectrometer 290 may determine the elemental, molecular, and energized states of mass compositions for off-gases based on sensors within off-gas sections such as Off-Gas Removal 280. Mass Spectrometer 290 may also determine the elemental, molecular, and energized states of mass compositions of by-product liquid slag and liquid metal in sections Slag Removal 270 and/or Liquid Removal 260. In some embodiments, Mass Spectrometer 290 may be further connected to Plasma Furnace 200 to control the Mixture 210 flow rate and composition. In some embodiments, Mass Spectrometer 290 may be connected with Cathode 230 and/or Anode 240 to further control the amperage, voltage, arc length, and the gas composition within the plasma arc zone.

Figure 3:
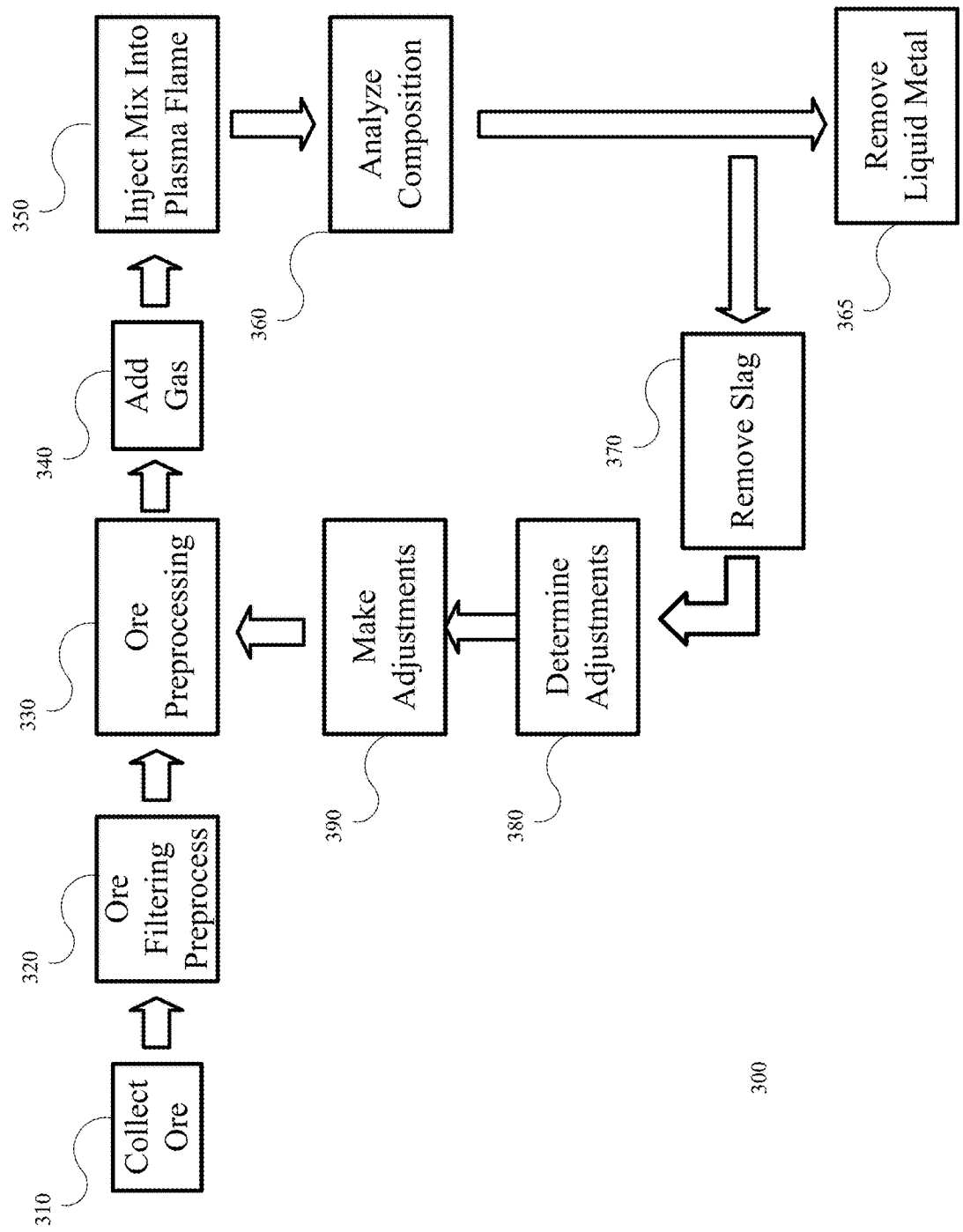
FIG. 3 is a flowchart of an exemplary method for reducing metal oxides in a plasma arc torch comprising a cathode and an anode.

FIG. 3 depicts an exemplary flowchart for lowering the activation energy of metallic reduction consistent with the disclosed embodiments. In step 310, various sources of the targeted metal may be collected. For instance, in some embodiments, such as those where elemental Fe is the targeted metal, step 310 may comprise collecting iron ore, metallic ore containing predominately iron compounds, and/or scraps of metal containing predominately iron. Additionally, in some embodiments, the collected metals include fine pieces or larger chunks. The fine and metallic chunks may be any elemental metal in molecular combination with oxygen. For instance, the collected metallic chunks may comprise iron-based oxides previously described, such as FeO, $Fe_2O_3$, $Fe_3O_4$, $Cr_2O_3$, $Al_2O_3$, $SiO_2$, $MnO_2$, MgO, CuO, a combination of the foregoing, and/or a combination of iron-based and noniron oxides. The collected target metal may comprise raw mined iron ore of various sizes and containing multiple oxides. The collected target metal may comprise processed raw iron ore. In some embodiments, the processed raw iron ore may include preprocessed and size-reduced chunks from pulverizing, crushing, tumbling, sintering, or sieving. In alternative embodiments, the processed iron ore may include chunks processed by BOF, BF, SR, EAF, and/or DR processes. The fine and metallic chunks collected may comprise recycled metal or metal chunks collected from entities specializing in scrapping. The recycled metal and/or scrap metal chunks may further comprise metals of varying elemental impurities such as rust, oxidation, or other foreign components. The recycled metal and/or scrap metal chunks may further comprise metals of varying alloyed elements. It will be further understood by one skilled in the art that the collection of fine and metallic chunks is not limited to the means discussed herein.

In step 320, the collected metal from 310 undergoes a filtering process. In some embodiments, the collected metal may be filtered and separated based on chunk size (e.g., fine 10-30 mm). In some embodiments, the collected metal may be filtered and separated based on percentage of targeted metal composition (e.g., greater than 98.0 percent Fe by weight). The collected metal may undergo tumbling, sieving, or separation by other filtering means.

In step 330, the collect metal may undergo preprocessing. In some embodiments, the collected metal may undergo physical reduction such as pulverizing, crushing, tumbling, or other means of reducing the chunk size. In some embodiments, the collected metal may undergo heat treatments; such as, heating until low-melting temperature additives are melted away, or sintering to facilitate additional particle size modification. In some embodiments, the metal chunks may be heated to near-melting temperatures. The collected metal may undergo heat treatments in open- or closed-air furnaces. In one embodiment, the open-air furnace may be exposed to atmospheric gases. In another embodiment, the closed-air furnace may be exposed to controlled gas flows. Additionally, in some embodiments, the collected metal may undergo preprocessing by means discussed above such as BOF, BF, SR, EAF, and/or DR.

In step 340, the preprocessed metal is mixed with controlled gases. In some embodiments, the controlled gases may comprise Reducing Agent Gas 166 and Conducting Gas 164 discussed above. Sensors and controllers may be used to control the gas flow and pressure. The controlled gas composition may be based on the collected metal and designed to undergo redox reactions with the collected metal in order to produce the targeted elemental metal.

In step 350, the mixed metal and controlled gases are injected into the plasma arc zone. The plasma arc zone may comprise plasma electrodes in HPSR processes discussed herein, and may comprise Plasma Furnace 170 and/or Plasma Furnace 200. In some embodiments, the conducting gas may react with the electric current and produce the plasma arc. The mixed metal may react with Reducing Agent Gas 164 and undergo redox reactions. In some embodiments, additional sensors may be connected to the plasma arc zone to determine the amperage and voltage output values for plasma electrodes associated with Plasma Furnace 170 and/or Plasma Furnace 200. And, the plasma arc length and size may be determined based on the sensor readings.

In step 360, the composition of the products exiting the plasma arc zone may be analyzed. The products may comprise redox reaction by-products, such as those from step 350, and/or mixed metal and controlled gases, such as those from steps 330 and 340. In some embodiments, the products of steps 330-350 may be further analyzed by sets of pressure and flow controllers and sensors. In some embodiments, the pressure and flow controllers, and/or the sensors, may be distributed throughout the HPSR plasma furnace casing (such as Plasma Furnaces 170 and/or 200). The pressure and flow controllers, and/or the sensors, may be connected to a computing system with dedicated memory and processors for analyzing the controller data such as a mass spectrometer (e.g., Mass Spectrometer 190 and/or 290). As described above, the mass spectrometer may determine the elemental, molecular, and energized states of mass compositions within the HPSR plasma furnace. In some embodiments, the controllers, and/or sensors, may be located throughout the HPSR plasma furnace. The mass compositions throughout the HPSR plasma furnace may be analyzed. And in some embodiments, it may be determined that the HPSR plasma furnace contains solids, liquids, and gases that may be further associated with potential redox reactions pertaining to the targeted metal. In some embodiments, it may be determined that the HPSR plasma furnace contains by-product slag liquids, targeted liquid metal, and off-gases.

If it is determined that the HPSR plasma furnace contains targeted elemental liquid metal, then method 300 may proceed to step 365. In step 365, due to density and gravity, the redox reaction by-product targeted elemental liquid metal may collect near the bottom of the HPSR plasma furnace. In some embodiments, the liquid metal may collect near a removal system such as Liquid Removal 260 described above and associated pumps of Liquid Removal 260 may remove the liquid metal from the HPSR plasma furnace. The liquid elemental metal may comprise the targeted metal, for instance elemental liquid Fe in some embodiments. In some embodiments, the liquid elemental metal may be removed through a cooling system consistent with the cooling systems discussed herein. In some embodiments, the liquid elemental metal may be removed and undergo post-processing for additional cooling and/or formation of the solid elemental metal. In some embodiments, the liquid elemental metal may be combined with additives to form metallic alloys. Otherwise, method 300 may proceed to step 370. It may be further understood by one skilled in the art that method 300 may proceed from 365 to 370, or in some embodiments, method 300 may proceed to step 365 and stop.

In step 370, redox reaction by-product nontargeted elemental liquid, i.e., slag, may collect above the targeted elemental liquid metal due to differences in densities. In some embodiments, the slag may collect near a a removal system such as Slag Removal 270 described above and associated pumps of Slag Removal 270 may remove the slag from the HPSR plasma furnace. The liquid slag may comprise the targeted metal-based alloys and/or the remaining nongaseous by-products. In some embodiments, the liquid slag may be removed through a cooling system consistent with the cooling systems discussed herein. In some embodiments, the liquid slag may be removed and sent back to ore preprocessing described in step 330.

In step 380, adjustments are determined for steps 330-350 based on the HPSR analyzed composition from step 360 and the removed products from steps 365 (if any) and 370. For instance, in some embodiments, method 300 may determine that the composition within HPSR plasma furnace was not properly heated within the plasma arc center because the collected and filtered metallic chunks from steps 310 and 320 were too large. Thus, it may be determined that additional preprocessing of metallic chunk size reduction is required in step 330. Alternatively, in some embodiments, it may be determined that the metallic and gas mixtures in the plasma arc center are not achieving optimal temperature within a certain time period (e.g., the time it takes to travel through the plasma arc zone). In these instances, additional heat preprocessing at step 330 may be necessary. In some embodiments, it may be determined that excessive amounts of elemental impurities such as rust, oxidation, or other foreign components, are present in the metallic chunk and controlled gas mixture, and thus additional preprocessing at step 330 may be necessary to remove the impurities. In some embodiments, it may be determined that the post-processed HPSR analyzed composition from step 360 does not contain sufficient amounts of redox by-products, and thus the added gases from step 340 may require adjusting to increase the redox reaction rates. Alternatively, in some embodiments, it may be determined that the plasma arc requires additional conductive gases, and thus the added gases from step 340 may require adjusting. In some embodiments, it may be determined that the plasma arc zone requires changes to the electric current, and thus the controlled amperage, voltage, and arc length from step 350 may require adjustment. Alternatively, in some embodiments, it may be determined that the flow rate of mixed metallic chunks and controlled gases into the plasma arc in step 350 requires adjustment. In some embodiments, the determined adjustments may include the removed slag from step 370 such that steps 330-350 factor in the presence of the hot liquid slag.

In step 390, the determined adjustments from step 380 are made to steps 330-350 consistent with the principles discussed above. In some embodiments, the removed slag from step 370 is included into step 330 with the collected and filtered metallic chunks.

Figure 4:
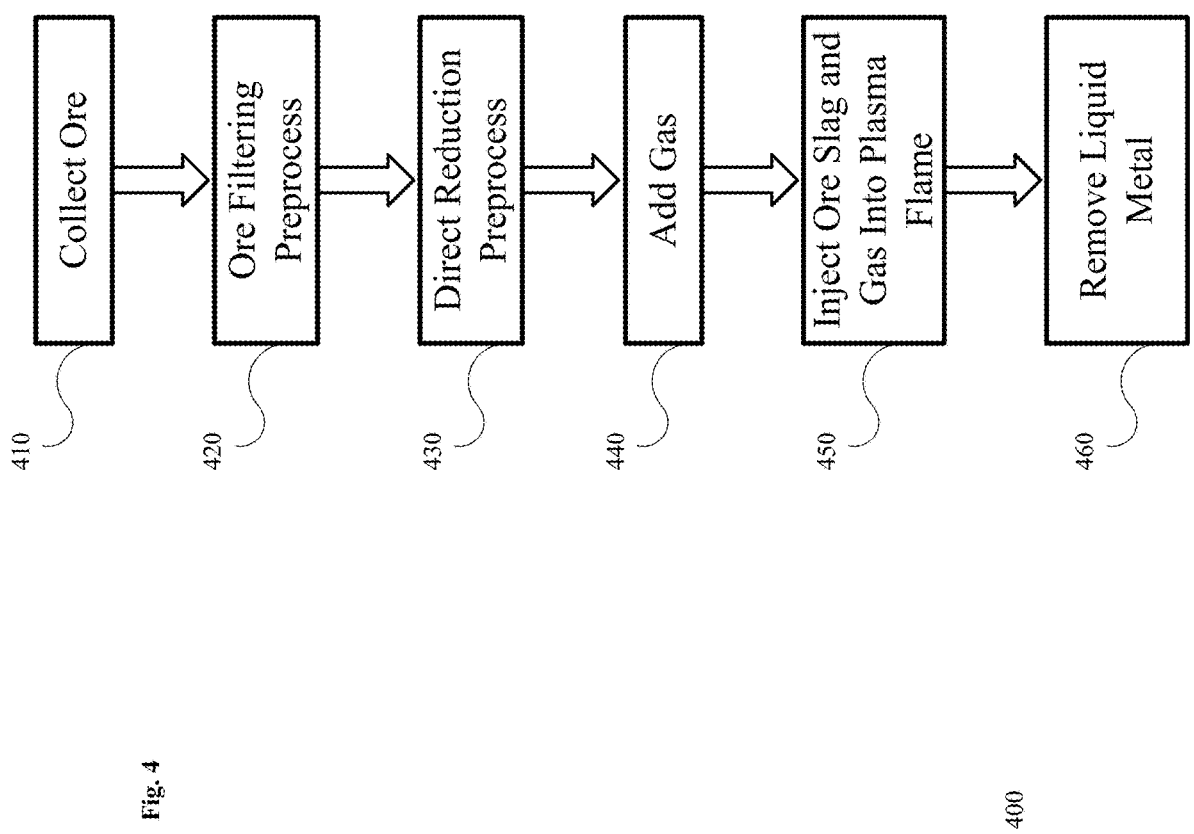
FIG. 4 is a flowchart of an exemplary method for lowering the activation energy of metallic reduction with combined direct reduction preprocessing and HPSR processing.
Figure 5:
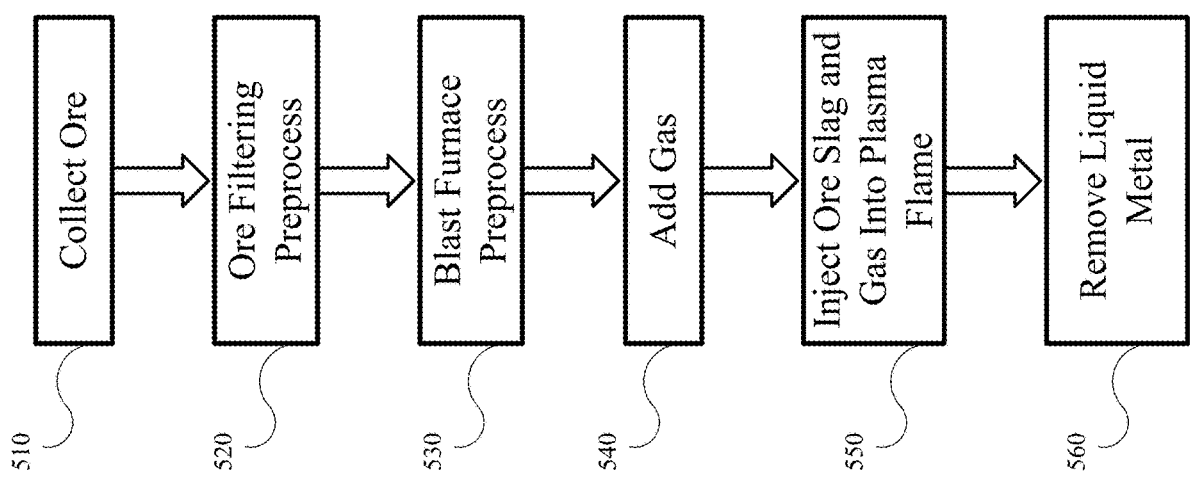
FIG. 5 is a flowchart of an exemplary method for lowering the activation energy of metallic reduction with combined blast furnace preprocessing and HPSR processing.
Figure 6:
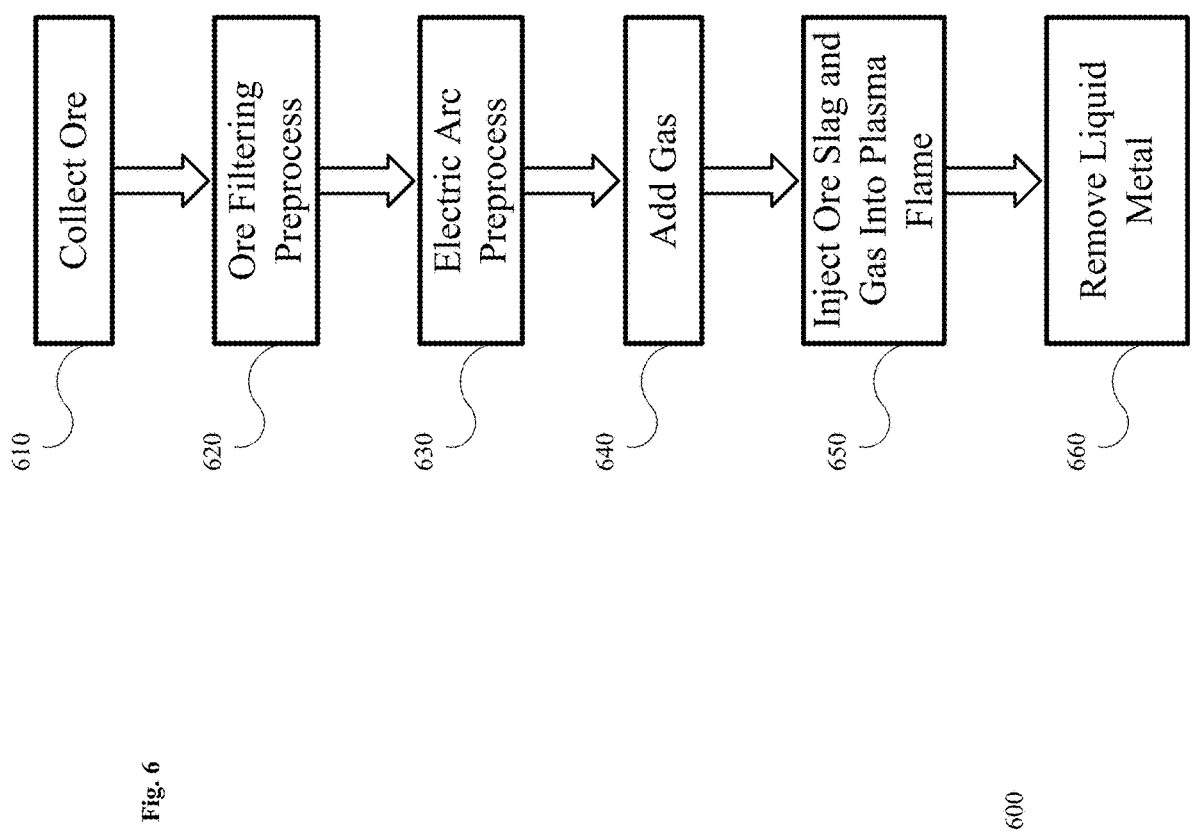
FIG. 6 is a flowchart of an exemplary method for lowering the activation energy of metallic reduction with combined electric arc preprocessing and HPSR processing.

Exemplary methods are now disclosed in FIGS. 4-6 for lowering the activation energy of metallic reduction in combination with other reduction processes.

FIG. 4 depicts an exemplary method for lowering the activation energy of metallic reduction with combined direct reduction preprocessing and HPSR processing consistent with the disclosed embodiments. In step 410, various sources of the targeted metal may be collected. For instance, in some embodiments where elemental Fe is the targeted metal, iron ore, metallic ore containing predominately iron compounds, and scraps of metal containing predominately iron are collected. Additionally, in some embodiments the collected metals include fine pieces or larger chunks. As described in step 310, the fine and metallic chunks may be any elemental metal in molecular combination with oxygen, such as those described herein. The collected target metal may comprise raw mined iron ore of various sizes and containing multiple oxides. The collected target metal may comprise processed raw iron ore. In some embodiments, the processed raw iron ore may include preprocessed and size-reduced chunks from pulverizing, crushing, tumbling, sintering, or sieving.

In step 420, the collected metal from step 410 may undergo a filtering process, such as the filtering process described for step 320.

In step 430, the collected metal may undergo a direct reduction preprocessing. Direct reduction may use carbon-based reducing gases and heat the collected metal in low temperature furnace. The reducing agent gas may include Reducing Agent Gas 164 described above, and/or $H_2O$, $H_2$, H, C, CO, and $CO_2$ gases or combinations thereof. In some embodiments, iron ore may be reduced in a DR low temperature furnace (e.g., 800 to 1200° C.) with the flow of hydrogen and/or carbon monoxide reducing agent gases. The preprocessed metal may contain unprocessed metallic ore, reduced metal chunks, and/or partially processed liquid slag. It may be further understood that the preprocessed by products (i.e. the at-temperature metal and off-gases) may be analyzed by means discussed herein.

In step 440, like step 340 described above, the at-temperature (e.g., 800 to 1200° C.) preprocessed metal is mixed with controlled gases comprising, for example, Reducing Agent Gas 164 and Conducting Gas 166. Sensors and controllers may be used to control the gas flow and pressure. The controlled gas composition may be based on the collected metal and designed to undergo redox reactions with the collected metal in order to produce the targeted elemental metal.

In step 450, the at-temperature preprocessed metal and controlled gases are injected into the HPSR plasma arc zone. The plasma arc zone may comprise plasma electrodes common in HPSR processes discussed herein, and may comprise Plasma Furnace 170 and/or Plasma Furnace 200. The conducting gas may react with the electric current and produce the plasma arc. The mixed metal may react with Reducing Agent Gas 164 and undergo redox reactions. In some embodiments, it may be further determined that the plasma arc zone is based on certain amperage, voltage, and arc length values.

In step 460, the composition of the products emerging from the plasma arc zone are analyzed. The products may comprise redox reaction by-products from step 450 and/or mixed metal and controlled gases, from steps 430 and 440. In some embodiments, the products of steps 430-450 may be further analyzed by sets of pressure and flow controllers, and sensors. In some embodiments, the pressure and flow controllers, and/or the sensors, may be distributed throughout the HPSR plasma furnace casing (such as Plasma Furnaces 170 and/or 200). The pressure and flow controllers, and/or the sensors, may be connected to a computing system with dedicated memory and processors for analyzing the controller data such as a mass spectrometer (e.g., Mass Spectrometer 190 and/or 290). The mass spectrometer may determine the elemental, molecular, and energized states of mass compositions within the HPSR plasma furnace. In some embodiments, the controllers, and/or sensors, may be located throughout the HPSR plasma furnace. The mass compositions throughout the HPSR plasma furnace may be analyzed. And in some embodiments, it may be determined that the HPSR plasma furnace contains solids, liquids, and gases that may be further associated with potential redox reactions pertaining to the targeted metal. In some embodiments, it may be determined that the HPSR plasma furnace contains by-product slag liquids, targeted liquid metal, and off-gases. In some embodiments, the redox reaction by-product targeted elemental liquid metal may be collected and be removed. The liquid elemental metal may comprise the targeted metal, for instance elemental liquid Fe in some embodiments. In some embodiments, the liquid elemental metal may be removed through a cooling system consistent with the cooling systems discussed herein. In some embodiments, the liquid elemental metal may be removed and undergo post-processing for additional cooling and/or formation of the solid elemental metal. In some embodiments, the liquid elemental metal may be combined with additives to form metallic alloys.

FIG. 5 depicts an exemplary method for lowering the activation energy of metallic reduction with combined blast furnace preprocessing and HPSR processing consistent with the disclosed embodiments. In step 510, various sources of the targeted metal may be collected. For instance, in some embodiments, elemental Fe is the targeted metal, thus iron ore, metallic ore containing predominately iron compounds, and scraps of metal containing predominately iron are collected. Additionally, in some embodiments the collected metals include fine pieces or larger chunks. The fine and metallic chunks may be any elemental metal in molecular combination with oxygen. For instance, the collected metallic chunks may comprise iron-based oxides such as wüstite (FeO), hematite ($Fe_2O_3$), and magnetite ($Fe_3O_4$); or other metallic-based oxides such as $Cr_2O_3$, $Al_2O_3$, $SiO_2$, $MnO_2$, MgO, and/or CuO. In some embodiments, combinations of iron-based and non-iron oxides may be combined. The collected target metal may comprise raw mined iron ore of various sizes and containing multiple oxides. The collected target metal may comprise processed raw iron ore. In some embodiments, the processed raw iron ore may include preprocessed and size-reduced chunks from pulverizing, crushing, tumbling, sintering, or sieving.

In step 520, the collected metal from step 510 undergoes a filtering process, such as the filtering process described for step 320.

In step 530, the collected metal may undergo a blast furnace preprocessing. Blast furnaces may use carbon-based ores, such as coke, to heat the collected metal in low temperature furnaces. The heated coke provides the reducing agent gas (e.g., C, CO, and/or $CO_2$ gases or combinations thereof). In some embodiments, iron ore may be reduced in a BF low temperature furnace (e.g., 800 to 1200° C.) in open air. The preprocessed metal may contain unprocessed metallic ore, reduced metal chunks, and/or partially processed liquid slag. The preprocessed by products (e.g., the at-temperature metal and off-gases) may be analyzed by means discussed herein.

In step 540, the at-temperature (e.g., 800 to 1200° C.) preprocessed metal is mixed with controlled gases. The controlled gases may comprise Reducing Agent Gas 164 and Conducting Gas 164 described above. Sensors and controllers may be used to control the gas flow and pressure. The controlled gas composition may be based on the collected metal and designed to undergo redox reactions with the collected metal in order to produce the targeted elemental metal.

In step 550, the at-temperature preprocessed metal and controlled gases are injected into the HPSR plasma arc zone. The plasma arc zone may comprise plasma electrodes common in HPSR processes discussed herein, and may comprise Plasma Furnace 170 and/or Plasma Furnace 200. The conducting gas may react with the electric current and produce the plasma arc. The mixed metal may react with the reducing agent gas and undergo redox reactions. In some embodiments, it may be further determined that the plasma arc zone is based on certain amperage, voltage, and arc length values.

In step 560, the composition of the products emerging from the plasma arc zone may be analyzed. The products may comprise redox reaction by-products, from step 550, and/or mixed metal and controlled gases, from steps 530 and 540. In some embodiments, the products of steps 530-550 may be further analyzed by sets of pressure and flow controllers, and sensors. In some embodiments, the pressure and flow controllers, and/or the sensors, may be distributed throughout the HPSR plasma furnace casing (such as Plasma Furnaces 170 and/or 200). The pressure and flow controllers, and/or the sensors, may be connected to a computing system with dedicated memory and processors for analyzing the controller data such as a mass spectrometer (e.g., Mass Spectrometer 190 and/or 290). The mass spectrometer may determine the elemental, molecular, and energized states of mass compositions within the HPSR plasma furnace. In some embodiments, the controllers, and/or sensors, may be located throughout the HPSR plasma furnace. The mass compositions throughout the HPSR plasma furnace may be analyzed. And in some embodiments, it may be determined that the HPSR plasma furnace contains solids, liquids, and gases that may be further associated with potential redox reactions pertaining to the targeted metal. In some embodiments, it may be determined that the HPSR plasma furnace contains by-product slag liquids, targeted liquid metal, and off-gases. In some embodiments, the redox reaction by-product targeted elemental liquid metal may be collected and be removed. The liquid elemental metal may comprise the targeted metal, for instance elemental liquid Fe in some embodiments. In some embodiments, the liquid elemental metal may be removed through a cooling system consistent with the cooling systems discussed herein. In some embodiments, the liquid elemental metal may be removed and undergo post-processing for additional cooling and/or formation of the solid elemental metal. In some embodiments, the liquid elemental metal may be combined with additives to form metallic alloys.

FIG. 6 depicts an exemplary method for lowering the activation energy of metallic reduction with combined electric arc preprocessing and HPSR processing. In step 610, various sources of the targeted metal may be collected. For instance, in some embodiments where elemental Fe is the targeted metal, iron ore, metallic ore containing predominately iron compounds, and scraps of metal containing predominately iron are collected. Additionally, in some embodiments the collected metals include fine pieces or larger chunks. As described in step 310, the fine and metallic chunks may be any elemental metal in molecular combination with oxygen, such as those described herein (e.g., FeO, $Fe_2O_3$, $Fe_3O_4$, $Cr_2O_3$, $Al_2O_3$, $SiO_2$, $MnO_2$, MgO, CuO, a combination of the foregoing, etc.). The collected target metal may comprise raw mined iron ore of various sizes and containing multiple oxides. The collected target metal may comprise processed raw iron ore. In some embodiments, the processed raw iron ore may include preprocessed and size-reduced chunks from pulverizing, crushing, tumbling, sintering, or sieving.

In step 620, the collected metal from step 610 undergoes a filtering process, such as the filtering process described for step 320.

In step 630, the collected metal may undergo an electric arc preprocessing. Electric arc furnaces may use carbon-based ores, such as coke, to heat the collected metal in low temperature furnaces. The low temperature furnaces, collected metal, and coke may be heated by an electrical current. The heated coke in addition to added gases provide the reducing agent gas (e.g., C, CO, and/or $CO_2$ gases or combinations thereof). The preprocessed metal may contain unprocessed metallic ore, reduced metal chunks, and/or partially processed liquid slag. It may be further understood that the preprocessed by products (e.g., the at-temperature metal and off-gases) may be analyzed by means discussed herein. Additionally, it may be further understood by one skilled in the art that the electric arc furnace discussed here in step 630 may be combined with the HPSR furnace described in step 650 such that the same electrodes and electric current may be used in both processes.

In step 640, the at-temperature (e.g., 800 to 1800° C.) preprocessed metal is mixed with controlled gases. The controlled gases may comprise Reducing Agent Gas 164 and Conducting Gas 166 described above. Sensors and controllers may be used to control the gas flow and pressure. The controlled gas composition may be based on the collected metal and designed to undergo redox reactions with the collected metal in order to produce the targeted elemental metal.

In step 650, the at-temperature preprocessed metal and controlled gases are injected into the HPSR plasma arc zone. As noted above, in some embodiments, the electric arc and HPSR furnaces may be one in the same, thus it may be further understood that the mixture may not be physically injected into the plasma arc zone, rather the plasma arc zone may be applied onto the mixture. The plasma arc zone may comprise plasma electrodes common in HPSR processes discussed herein, and may comprise Plasma Furnace 170 and/or Plasma Furnace 200. The conducting gas may react with the electric current and produce the plasma arc. The mixed metal may react with Reducing Agent Gas 164 and undergo redox reactions. In some embodiments, it may be further determined that the plasma arc zone is based on certain amperage, voltage, and arc length values.

In step 660, the composition of the products exiting the plasma arc zone are analyzed. The products may comprise redox reaction by-products, from step 650, and/or mixed metal and controlled gases, from steps 630 and 640. In some embodiments, the products of steps 630-650 may be further analyzed by sets of pressure and flow controllers, and sensors. In some embodiments, the pressure and flow controllers, and/or the sensors, may be distributed throughout the HPSR plasma furnace casing (such as Plasma Furnaces 170 and/or 200). The pressure and flow controllers, and/or the sensors, may be connected to a computing system with dedicated memory and processors for analyzing the controller data such as a mass spectrometer (e.g., Mass Spectrometer 190 and/or 290). The mass spectrometer may determine the elemental, molecular, and energized states of mass compositions within the HPSR plasma furnace. In some embodiments, the controllers, and/or sensors, may be located throughout the HPSR plasma furnace. The mass compositions throughout the HPSR plasma furnace may be analyzed. And in some embodiments, it may be determined that the HPSR plasma furnace contains solids, liquids, and gases that may be further associated with potential redox reactions pertaining to the targeted metal. In some embodiments, it may be determined that the HPSR plasma furnace contains by-product slag liquids, targeted liquid metal, and off-gases. In some embodiments, the redox reaction by-product targeted elemental liquid metal may be collected and be removed. The liquid elemental metal may comprise the targeted metal, for instance elemental liquid Fe in some embodiments. In some embodiments, the liquid elemental metal may be removed through a cooling system consistent with the cooling systems discussed herein. In some embodiments, the liquid elemental metal may be removed and undergo post-processing for additional cooling and/or formation of the solid elemental metal. In some embodiments, the liquid elemental metal may be combined with additives to form metallic alloys.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

The invention claimed is:

1. A method of reducing metal oxides in a plasma arc torch comprising a cathode and an anode, said method comprising:
    collecting a set of metallic oxide ore;
    filtering the set of ore based on a particle size;
    preprocessing the filtered ore with application of a heat gradient or an electric current;
    mixing the preprocessed ore with a composition of reduction gases;
    injecting the mixed ore and gases into the plasma arc torch, wherein the plasma arc torch is encased in a pressurized chamber, to form a post-plasma mixture;
    collecting the post-plasma mixture in the pressurized chamber;
    analyzing the post-plasma mixture composition with a mass spectrometer; and
    separating the post-plasma mixture into a set of slag and a set of liquid.

2. The method of claim 1, wherein collecting the set of metallic oxide ore further comprises receiving metallic oxide ore in the form of raw minerals, oxidized processed, reduction processed, or scrap metal.

3. The method of claim 1, wherein the collected set of metallic oxide ore includes one of the following:
    a set of metallic oxide ore containing primarily FeO, $Fe_2O_3$, or $Fe_3O_4$;
    a set of metallic oxide ore containing primarily $Cr_2O_3$;
    a set of metallic oxide ore containing primarily $Al_2O_3$;
    a set of metallic oxide ore containing primarily $SiO_2$;
    a set of metallic oxide ore containing primarily $MnO_2$;
    a set of metallic oxide ore containing primarily MgO; or
    a set of metallic oxide ore containing primarily CuO.

4. The method of claim 1, wherein the filtering further comprises of decreasing the metallic oxide ore particle size by pulverizing, crushing, tumbling, sintering, or sieving.

5. The method of claim 1, wherein the preprocessing comprises heating the filtered ore with a blast furnace.

6. The method of claim 1, wherein the preprocessing comprises heating the filtered ore within a reducing environment of hydrogen or carbon gas.

7. The method of claim 1, wherein the preprocessing comprises applying an electric current through filtered ore in an electric arc furnace.

8. The method of claim 1, wherein the reduction gases comprise at least one of Ar, $N_2$, $H_2O$, $H_2$, H, C, CO, or $CO_2$.

9. The method of claim 1, wherein the pressurized chamber includes a cooling system.

10. The method of claim 9, wherein the plasma arc torch comprises an anode and a hollow graphite cathode.

11. The method of claim 10, wherein the pressurized chamber includes a set of sensors to detect at least one of a rate at which the mixed ore and gases are injected into the plasma arc torch, or an electric current through the cathode and anode.

12. The method of claim 11, wherein the pressurized chamber includes separate removal systems for the post-plasma set of slag and set of liquid.

13. The method of claim 11, further comprising adjusting the composition of reduction gases mixed with the preprocessed ore based on the post-plasma mixture composition analysis, and the detected at least one of the rate at which the mixed ore and gases are injected into the plasma arc torch or the detected electric current through the cathode and anode.

14. The method of claim 11, further comprising adjusting the rate of injection of the mixed ore and gases into the plasma arc torch based on the post-plasma mixture composition analysis, and the detected at least one of the rate at which the mixed ore and gases are injected into the plasma arc torch or the detected electric current through the cathode and anode.

15. The method of claim 11, further comprising adjusting the electric current through the cathode and anode based on the post-plasma mixture composition analysis and the detected at least one of the rate at which the mixed ore and gases are injected into the plasma arc torch or the detected electric current through the cathode and anode.

16. The method of claim 12, wherein the separated post-plasma set of slag is sent, based on the post-plasma mixture composition analysis, and the detected at least one of the rate at which the mixed ore and gases are injected into the plasma arc torch or the detected electric current through the cathode and anode, to filtering for preprocessing and mixing with the mixed ore and gases.

17. The method of claim 12, wherein the separated post-plasma set of liquid, based on the post-plasma mixture composition analysis, undergoes:
    cooling if the post-plasma mixture analysis indicates the set of liquid is reduced metal; or
    filtering and mixing with the mixed ore and gases if the post-plasma mixture analysis indicates the set of liquid is not reduced metal.

18. The method of claim 17, wherein the cooling comprises an environment of Ar, $N_2$, $H_2O$, $H_2$, H, C, CO, or $CO_2$ gases.

* * * * *